No. 653,029. Patented July 3, 1900.
H. F., C. & G. H. MIEHER.
DRAFT EQUALIZER.
(Application filed June 22, 1899.)
(No Model.)
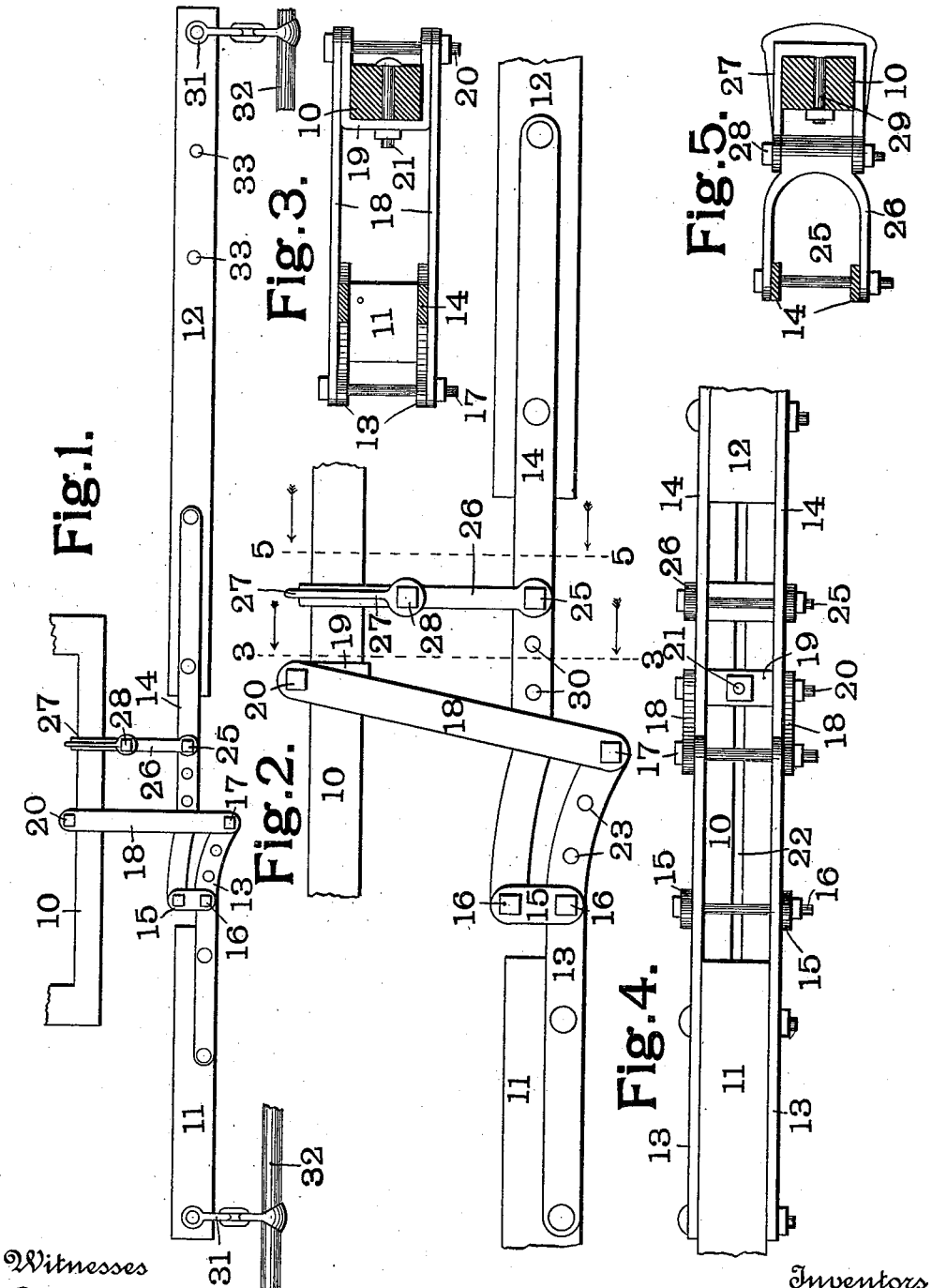
Witnesses
W. A. Alexander
David Stanward
Inventors
Henry F. Mieher
Charles Mieher
Gustavus H. Mieher
By Attorneys
Fowler & Fowler

UNITED STATES PATENT OFFICE.

HENRY F. MIEHER, CHARLES MIEHER, AND GUSTAVUS H. MIEHER, OF CARLINVILLE, ILLINOIS.

DRAFT-EQUALIZER.

SPECIFICATION forming part of Letters Patent No. 653,029, dated July 3, 1900.

Application filed June 22, 1899. Serial No. 721,409. (No model.)

*To all whom it may concern:*

Be it known that we, HENRY F. MIEHER, CHARLES MIEHER, and GUSTAVUS H. MIEHER, citizens of the United States of America, residing at Carlinville, in the county of Macoupin, in the State of Illinois, have invented a certain new and useful Draft-Equalizer, of which the following is such a full, clear, and exact description as will enable any one skilled in the art to which it appertains to make and use the same, reference being had to the accompanying drawings, forming part of this specification.

The object of our invention is to provide a draft-equalizer which will be simple of construction and which can be readily adjusted to vary the relative length of the beams and will not cause side draft.

Our invention consists in various novel features and details of construction, all of which are described in the following specification and pointed out in the claims affixed hereto.

In the accompanying drawings, which illustrate one form of draft-equalizer made in accordance with our invention, Figure 1 is a top plan view on a reduced scale. Fig. 2 is a top plan view of the main portion of the equalizer. Fig. 3 is a section on the line 3 3 of Fig. 2. Fig. 4 is a front view of the parts shown in Fig. 2, and Fig. 5 is a section on the line 5 5 of Fig. 2.

Like marks of reference refer to similar parts in the several views of the drawings.

10 represents the front bar of a gang-plow or other implement to which our equalizer is attached.

11 is the short beam, and 12 the long beam, of the equalizer. Extending from the end of the beam 11 are two parallel metal strips 13, and extending from the end of the beam 12 are two parallel metal strips 14. The strips 13 are pivotally connected to the strips 14 by means of short links 15 and bolts 16. Pivoted to the strips 13 by means of a bolt 17 are two long links 18. The links 18 are pivoted to a U-shaped part or clevis 19 by means of a bolt 20. The clevis 19 passes around the front bar 10 of the plow and is adjustably secured against movement in the direction of the length of said bar by means of a bolt 21, passing through a slot 22, Fig. 4, in said bar. The strips 13 are provided with holes 23 at different points at which it may be desired to secure the ends of the links 18 in order to change the length of the long beam. Secured to the strips 14 by means of a bolt 25 is a clevis 26. The clevis 26 is in turn pivoted to a clevis 27 by means of a bolt 28. The clevis 27 surrounds the front bar 10 of the plow and is adjustably secured against movement in the direction of the length of said bar by means of a bolt 29, Fig. 5, passing through the slot 22, above described. The strips 14 are provided with holes 30, so that the clevis 26 can be attached to them at different points so as to vary the length of the long beam. Secured to the outer ends of the beams 11 and 12 by means of clevises 31 are doubletrees 32. In the beam 12 are formed openings 33, by means of which the doubletree 32 may be adjusted along said beam.

When it is desired to change the relative length of the beams 11 and 12, the links 18 are adjusted along the strips 13 by means of the holes 23 and bolt 17, and the clevis 26 is adjusted along the strips 14 by means of the holes 30 and bolt 25. The doubletree 32 is correspondingly adjusted along the beam 12 by means of holes 33. By loosening the bolts 21 and 29 the clevises 19 and 27 can be adjusted along the bar 10 to apply the power at the proper point. The adjustment of the clevis 19 also allows the links 18 to be adjusted out of parallel with the clevises 26 and 27, as shown in Fig. 2. When the links 18 are set at the proper angle, their thrust overcomes any tendency to side draft. The two beams of the equalizer remain in substantially a straight line during the time they are in use, acting practically the same as a single beam. In some instances the beams 11 and 12 may be made of equal length, in which case the operation of the equalizer will be such that it may be applied to one side of the object to be drawn without causing side draft, as the side draft will be overcome by the thrust of the links 18.

Having fully described our invention, what we claim as new, and desire to secure by Letters Patent of the United States, is—

1. In a draft-equalizer, two beams pivotally connected together, a connection between one of said beams and the object to which the power is to be applied for exerting a thrust on said object, a connection between the other of said beams and said object for exerting a pull thereon, and means for adjusting said connections at an angle to each other without varying the relative length of the lever-arms of said beams.

2. In a draft-equalizer, two beams, the end of one of said beams being pivotally connected to a point intermediate of the length of the other beam, a connection between said latter beam and the object to which the power is to be applied for exerting a thrust on said object, a connection between the other of said beams and said object for exerting a pull thereon, and means for adjusting said connections at an angle to each other without varying the relative length of the lever-arms of said beams.

3. In a draft-equalizer, two beams, the end of one of said beams being pivotally connected to a point intermediate of the length of the other of said beams, a connection between said latter beam and the object to which the power is to be applied, a connection between the other of said beams and said object, means for adjusting the distance between the point of attachment of said beams and the point of attachment of said first-named connection to its beam, and independent means for adjusting said connections at an angle to each other.

4. In a draft-equalizer, two beams, a link or links pivotally connecting the end of one of said beams to a point intermediate the length of the other of said beams, a connection between said latter beam and the object to which the power is to be applied for exerting a thrust on said object, and a connection between the other of said beams and said object for exerting a pull thereon.

5. In a draft-equalizer, two beams, the end of one of said beams being pivotally connected to a point intermediate of the length of the other of said beams, said latter beam being provided with a forwardly-projecting end, a connection between said forwardly-projecting end and the object to which the power is to be applied, and a connection between said other beam and said object, said connections being adapted to be arranged at an angle to each other.

6. In a draft-equalizer, two beams, a link or links connecting the end of one of said beams to a point intermediate of the length of the other of said beams, said latter beam being provided with a forwardly-projecting end, a connection between said forwardly-projecting end and the object to which the power is to be applied, a connection between the other beam and said object, and means for adjusting said connections at an angle to each other without varying the relative length of the lever-arms of said beams.

In testimony whereof we have hereunto set our hands and affixed our seals in the presence of the two subscribing witnesses.

HENRY F. MIEHER. [L. S.]
CHARLES MIEHER. [L. S.]
GUSTAVUS H. MIEHER. [L. S.]

Witnesses:
ANDREW J. DUGGAN,
THOS. RINAKER.